US008825650B2

(12) United States Patent
Thompson et al.

(10) Patent No.: US 8,825,650 B2
(45) Date of Patent: *Sep. 2, 2014

(54) METHOD OF CLASSIFYING AND SORTING ONLINE CONTENT

(75) Inventors: Simon G Thompson, Melton (GB); Duong Nguyen, Ipswich (GB); Hakan Duman, Ipswich (GB); Fang Wang, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/988,738

(22) PCT Filed: Apr. 23, 2009

(86) PCT No.: PCT/GB2009/001053
§ 371 (c)(1),
(2), (4) Date: Oct. 20, 2010

(87) PCT Pub. No.: WO2009/130476
PCT Pub. Date: Oct. 29, 2009

(65) Prior Publication Data
US 2011/0035381 A1    Feb. 10, 2011

(30) Foreign Application Priority Data

Apr. 23, 2008   (GB) .................................. 0807410.6

(51) Int. Cl.
*G06F 7/00*      (2006.01)
*G06F 17/30*     (2006.01)

(52) U.S. Cl.
CPC .... *G06F 17/30707* (2013.01); *G06F 17/30864* (2013.01)
USPC ...................................................... 707/737

(58) Field of Classification Search
CPC .......... G06F 17/3061; G06F 17/30705; G06F 17/3071; G06F 17/30713
USPC ........................................................ 707/737
See application file for complete search history.

(56) References Cited

U.S. PATENT DOCUMENTS 5,857,179 A    1/1999   Vaithyanathan et al.
6,786,406 B1   9/2004   Maningas
(Continued)

FOREIGN PATENT DOCUMENTS

GB    2 365 576       2/2002
JP    2007233438   *  9/2007
(Continued)

OTHER PUBLICATIONS

Nurcan Durak, Blog Profile using Text Categorization, Published Jan. 2008, pp. 1-2.*

(Continued)

*Primary Examiner* — Jeffrey A Burke
(74) *Attorney, Agent, or Firm* — Nixon & Vanderhye PC

(57) ABSTRACT

A method, and associated apparatus, that allows online posts to be automatically analyzed and classified such that they can then be appropriately monitored or actioned. The classification method comprises analysis of the contents of the online posts, for example keyword extraction, the affinity of one poster to comment on the posts of a further poster and the relationship between one poster and their posts with other posters and their posts.

19 Claims, 1 Drawing Sheet

(56) References Cited

U.S. PATENT DOCUMENTS

| | | | |
|---|---|---|---|
| 6,831,663 B2* | 12/2004 | Chickering et al. | 715/700 |
| 6,978,274 B1 | 12/2005 | Gallivan et al. | |
| 6,981,040 B1* | 12/2005 | Konig et al. | 709/224 |
| 7,027,586 B2* | 4/2006 | Bushey et al. | 379/265.09 |
| 7,162,471 B1* | 1/2007 | Knight et al. | 707/750 |
| 7,188,079 B2* | 3/2007 | Arnett et al. | 705/7.31 |
| 7,203,704 B1 | 4/2007 | Stern et al. | |
| 7,590,603 B2* | 9/2009 | Zhang et al. | 706/12 |
| 7,689,452 B2* | 3/2010 | Lam et al. | 705/7.33 |
| 7,747,705 B1* | 6/2010 | Raja | 709/219 |
| 8,045,697 B1* | 10/2011 | Martin | 379/265.12 |
| 8,635,281 B2* | 1/2014 | Kelly | 709/205 |
| 2002/0120619 A1 | 8/2002 | Marso et al. | |
| 2003/0154072 A1 | 8/2003 | Young et al. | |
| 2004/0128357 A1 | 7/2004 | Giles et al. | |
| 2004/0172415 A1* | 9/2004 | Messina et al. | 707/104.1 |
| 2005/0071311 A1* | 3/2005 | Agrawal et al. | 707/1 |
| 2005/0210065 A1* | 9/2005 | Nigam et al. | 707/104.1 |
| 2006/0004561 A1 | 1/2006 | Zhang et al. | |
| 2006/0026593 A1* | 2/2006 | Canning et al. | 718/100 |
| 2006/0029106 A1 | 2/2006 | Ott et al. | |
| 2006/0080162 A1* | 4/2006 | Arnett et al. | 705/10 |
| 2006/0089924 A1* | 4/2006 | Raskutti et al. | 707/1 |
| 2006/0184464 A1* | 8/2006 | Tseng et al. | 706/14 |
| 2006/0233325 A1 | 10/2006 | Wu et al. | |
| 2006/0235934 A1 | 10/2006 | Wilson et al. | |
| 2006/0259481 A1 | 11/2006 | Handley | |
| 2006/0271564 A1 | 11/2006 | Meng Muntz et al. | |
| 2006/0284873 A1* | 12/2006 | Forrest et al. | 345/440 |
| 2007/0245035 A1 | 10/2007 | Attaran Rezaei et al. | |
| 2007/0250500 A1 | 10/2007 | Ismalon | |
| 2007/0280460 A1 | 12/2007 | Harris et al. | |
| 2007/0294281 A1 | 12/2007 | Ward et al. | |
| 2008/0065659 A1 | 3/2008 | Watanabe et al. | |
| 2008/0077574 A1* | 3/2008 | Gross | 707/5 |
| 2008/0114755 A1* | 5/2008 | Wolters et al. | 707/5 |
| 2008/0243607 A1* | 10/2008 | Rohan et al. | 705/14 |
| 2009/0006085 A1 | 1/2009 | Horvitz et al. | |
| 2009/0063254 A1* | 3/2009 | Paul et al. | 705/10 |
| 2009/0171984 A1* | 7/2009 | Park et al. | 707/100 |
| 2009/0222313 A1* | 9/2009 | Kannan et al. | 705/9 |
| 2010/0153325 A1* | 6/2010 | Amoroso et al. | 706/46 |
| 2010/0169237 A1* | 7/2010 | Howard et al. | 705/36 R |
| 2010/0312724 A1* | 12/2010 | Pinckney et al. | 706/11 |
| 2010/0325112 A1* | 12/2010 | Berger | 707/740 |

FOREIGN PATENT DOCUMENTS

| | | |
|---|---|---|
| KR | 20050074058 | 7/2005 |
| WO | 2004/100130 | 11/2004 |
| WO | 2005/043416 | 5/2005 |
| WO | 2008/045792 | 4/2008 |

OTHER PUBLICATIONS

Varlamis, I., Vassalos, V. and Palaios, A., *Monitoring the evolution of interests in the blogosphere*, Computer Sciences Department, Athens University of Economics and Business, Greece, 6 pgs., (date unknown).

Zafarani, R., Jashki, M. A., Baghi, H., and Ghorbani, A. A., *A Novel Approach for Social Behavior Analysis of the Blogosphere*, Faculty of Computer Science, University of New Brunswick, Fredericton, NB, Canada, pp. 356-367, 2008.

Carlson, Beth A., *Unsupervised Topic Clustering of Switchboard Speech Messages*, Lincoln Laboratory, Massachusetts Institute of Technology, Lexington, MA, pp. 315-318, 1996.

International Search Report for PCT/GB2009/001053, mailed Aug. 3, 2009.

Gao, W., Wong, K. F., Xia, Y., and Xu, R., *Clique Percolation Method for Finding Naturally Cohesive and Overlapping Document Clusters*, Department of Systems Engineering and Engineering Management, The Chinese University of Hong Kong, Shatin, N.T., Hong Kong, China, Y. Matsumoto et al. (Eds.): ICCPOL 2006, LNAI 4285, pp. 97-108, 2006.

Gao, Wei and Wong, Kam-Fai, *Natural Document Clustering by Clique Percolation in Random Graphs*, Department of Systems Engineering and Engineering Management, The Chinese University of Hong Kong, Shatin, N.T., Hong Kong, H. T. Ng et al. (Eds.): AIRS 2006, LNCS 4182, pp. 119-131, 2006.

Erdelyi, Miklos and Abonyi, Janos, *Node Similarity-based Graph Clustering and Visualization*, Department of Process Engineering, University of Pannonia, Veszprem, Hungary, pp. 483-494 (date unknown).

Gregory, Steve, *An Algorithm to Find Overlapping Community Structure in Networks*, Department of Computer Science, University of Bristol, England, 12 pgs. (date unknown).

Ding, C. H. Q., He, X, Zha, H., Gu, M., and Simon, H. D., *A Min-max Cut Algorithm for Graph Partitioning and Data Clustering*, NERSC Division, Lawrence Berkeley National Laboratory, University of California, Berkeley, CA; Department of Computer Science and Engineering, Pennsylvania State University, University Park, PA; Department of Mathematics, University of California, Berkeley, CA, 2001, pp. 107-114.

Phuc, Do and Phung, Nguyen Thi Kim, *Using Naive Bayes Model and Natural Language Processing for Classifying Messages on Online Forum*, Faculty of Information System, University of Information Technology, VNU-HCM, HoChiMinh City, VietNam, 2007, pp, 247-252.

Hennig, Sascha and Wurst, Michael, *Incremental Clustering of Newsgroup Articles*, University of Dortmund, Department of Computer Science, Baroperstr. 301, 44221 Dortmund, Germany, 10 pgs. (date unknown).

Gonzalez, M. C., Herrmann, H. J., Kertesz, J. and Vicsek, T., *Community structure and ethnic preferences in school friendship networks*, Institute for Computational Physics, Universitat Stuttgart, Pfaffenwaldring 27, D-70569, Stuttgart, Germany; Departamento de Fisica, Universidade Federal do Ceara, 60451-970 Fortaleza, Brazil; IfB, HIF E12, ETH Honggerberg, CH-8093 Zurich, Switzerland; Institute of Physics, Budapest University of Technology and Economics, H-1111 Budafoki ut. 8., Budapest, Hungary; Department of Biological Phusics and Statistical Biological Physics Research Group of HAS, Eotvos Lorand University, H-1117, Pazmany P. Setany 1A, Budapest, Hungary; Feb. 12, 2007, pp. 1-16.

International Search Report for PCT/GB2009/001022, mailed Jul. 23, 2009.

Office Action (15 pgs.) dated Sep. 13, 2011 issued in co-pending U.S. Appl. No. 12/988,714.

Nurcan Durak, Blog Profile Extraction using Text Categorization, Knowledge Discover & Web Mining Lab, Published 2009.

\* cited by examiner

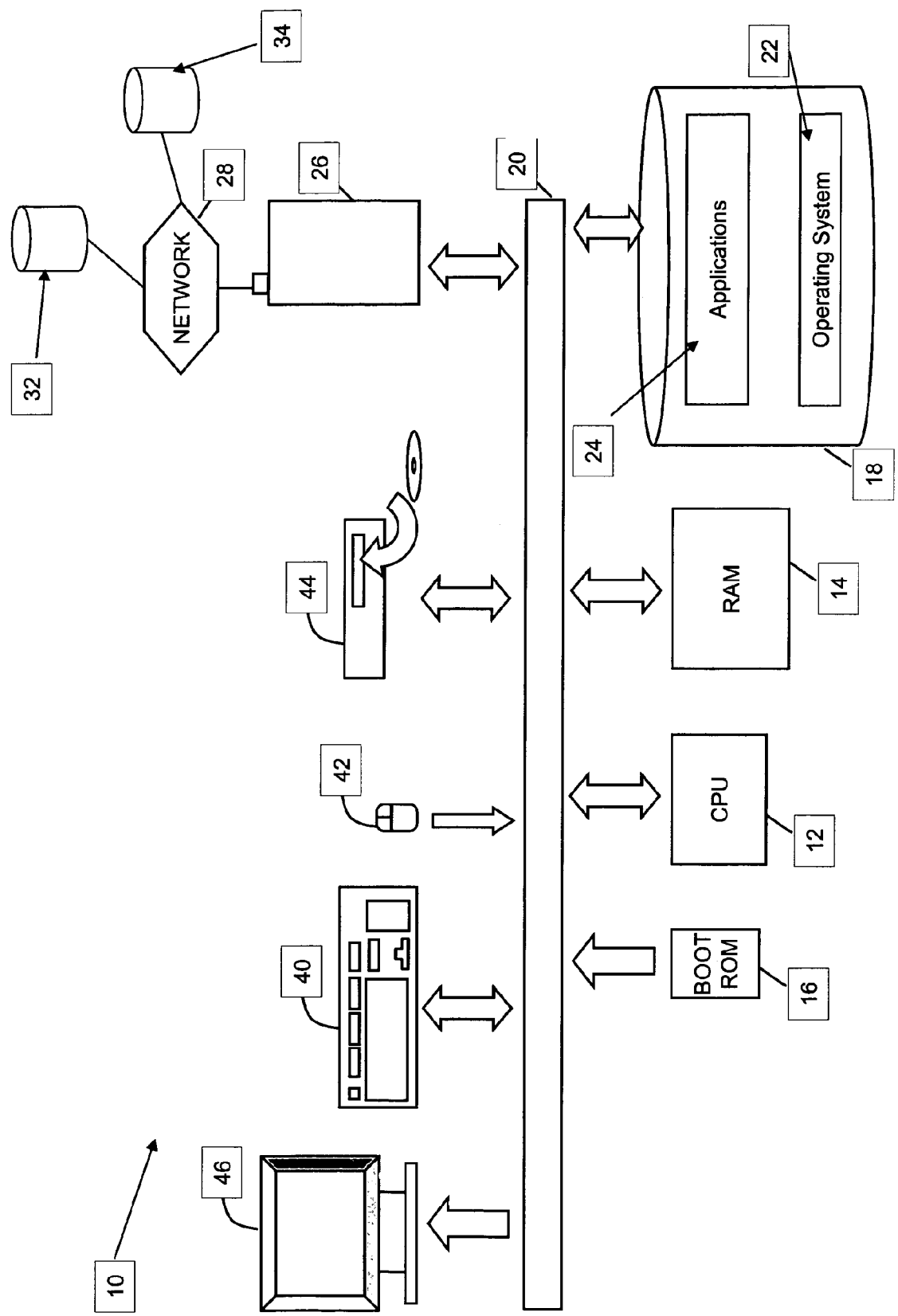

METHOD OF CLASSIFYING AND SORTING ONLINE CONTENT

METHOD

This application is the U.S. national phase of International Application No. PCT/GB2009/001053 filed 23 Apr. 2009, which designated the U.S. and claims priority to Great Britain Application No. 0807410.6, filed 23 Apr. 2008, the entire contents of each of which are hereby incorporated by reference.

The present invention relates to a method of classifying and sorting data, and in particular to a method of classifying and sorting user generated online content.

BACKGROUND AND SUMMARY

The Web and Web users are changing as the demographics of web use shift. Firstly there is a greater range of web sites and a number of dominant web destinations that serve as information hubs for various user communities. It is likely that most companies will not be able to provide the key discussion hub for every user community that it seeks to provide products to, and therefore customers are going to be discussing company products and services in a number of places on the web.

According to a first aspect of the present invention there is provided a method of classifying data, the data comprising a plurality of data sets, the method comprising the steps of: a) identifying data values from one or more of the plurality of data sets; b) classifying the one or more data sets on the basis of the data values identified in step a); and c) assigning the one or more data sets to one or more categories. Preferably, the method comprises the further step of: d) allocating one or more of the data sets to an agent in accordance with the result of step c).

Step a) may comprise: i) identifying the creator of one or more of the plurality of data sets; and ii) identifying one or more further data sets which for which the creator has an association with the creator identified in step i). Step b) may comprise; iii) classifying the one or more data sets based on the classification of the one or more further data sets identified in step ii). Step c) may comprise; iv) assigning the one or more data sets in accordance with the results of step iii).

In one particular embodiment of the present invention a) comprises extracting keywords from each of the plurality of data sets to form a plurality of keyword clusters. The keywords for extraction may be identified from a predetermined set of keywords. In step b) the classification comprises determining a ratio of keywords that match one of the keyword clusters to the total number of keywords. In step c) a data set may be assigned to a category in accordance with the keyword ratio value. Furthermore, in step iii), a ratio may be determined in accordance with the number of data sets assigned to each category and the total number of data sets created.

According to a second aspect of the present invention there is provided an apparatus comprising a central processing unit, volatile memory means and data storage means wherein, in use, the apparatus is configured to execute any of the methods as described above.

According to a third aspect of the present invention there is provided a tangible computer readable medium comprising computer executable code for performing a any of the methods as described above.

The present invention provides a system and a method for gathering user generated online content, organising it, allocating it to agents for processing and helping the agents to handle it. The method of the present invention comprises a resourcing system and a content analysis system to prioritize and distribute work to the agents. The content analysis system is used to partition the available posts into topics. These are matched against the agents profiles and allocated to their workstacks for processing. As posts arrive dynamically they can be allocated into work stacks in preference to posts that are already queued there. Posts that are de-queued can either be ejected from the work stack altogether or can be reallocated to another agent. The method of the present invention further comprises history and posting mechanisms which enable agents to handle interactions over time by monitoring responses to agent posts and ensuring the post is redistributed to the agent. This can be used as prioritization information for the agents workstack and can be used to enable agents to see the contexts of the posts that they are handling. Furthermore, the present invention utilises an automated cluster formation system to find significant topics in the data.

BRIEF DESCRIPTION OF THE DRAWINGS

Embodiments of the present invention will now be described, by way of example only, with reference to the accompanying drawings in which:

FIG. 1 shows a schematic depiction of a general purpose computing device.

DETAILED DESCRIPTION OF PRESENT EXAMPLE EMBODIMENTS

FIG. 1 shows a schematic depiction of a general purpose computing device 10 which comprises well-known hardware components connected together in a conventional manner. The well-known hardware components comprise central processing unit (CPU) 12, random access memory (RAM) 14, read only memory (ROM) 16, one or more disk drives 18 and input/output devices 30, 32, 34 and 36. The hardware components are interconnected via one or more data and address buses 20. The input/output devices comprise a keyboard 40, a mouse 42, a CD-ROM (and/or DVD) drive 44 and a display 46. The disk drives store an operating system 22, which controls the operation of the computing device 10 when it is loaded into memory and executed. The disk drives also store one or more application programs 24 which can be loaded into memory and executed so as to provide additional functionality. The computing device 10 is connected to a network 28 by a network interlace 26 such that other computers and devices may establish communication sessions with the computing device 10.

In particular, the computing device 10 is in communication with one or more online information stores 32, 34 which comprise user generated content, such as, for example, blogs, wikis, forum posts, newsgroups, etc. The online information stores are used by a number of online users to leave comments, ask questions, seek help and advice, etc. The application programs that enable the one or more online information stores 32, 34 to operate may be executed by the computing device 10 or by one or other computers. The network 28 may be a LAN if the computing device 10 is co-located with the one or more online information stores 32, 34 (or if the computing device 10 is executing the application programs that operate the online information stores). Alternatively, if the computing device is located remotely from the online information stores then the network may comprise a private WAN, an intranet, the Internet or some other form of network connection.

It is conventional for such online information stores to be monitored by agents so that they can moderate inappropriate behaviour, provide help, answer questions, etc. Each agent has a limited capacity for work to be done. The rate at which work is done by an agent can be recorded and estimated and will vary from agent to agent depending on the topic they are handing and the work that they are doing. For example, agents monitoring discussions to build FAQ data will need very little time per post. Agents that are providing technical customer support online will require considerable time allocation.

The present invention will now be described with reference to four posts, shown below in Table 1, which have been selected from a posting database, such as is found in an online information store.

TABLE 1

Sample posts

| Post ID | Author | Post |
|---|---|---|
| 1 | PaulB | After spending another 40 minutes trying to get through to the "technical helpdesk" in India, I was told that all my problems with my hub phone will be resolved by a software update. When I asked when the upgrade would be completed I was told "We do not have that information" Is it just me? No I don't think so. Another question gone unanswered. |
| 2 | Mike | Like most people on this forum I am patiently waiting for the software upgrade to R version which we are led to believe will cure most of the problems with the hub phone, the softphone and the hub. We are told one date then another. The 24th November was the latest date well I still have not received this update and my Hub has been left on 24 hours for 8 days now. Can anyone in any position of authority please tell its customers when this upgrade will happen and ensure we receive it immediately or tell us where to go to force an upgrade? |
| 3 | Zappo | I need to know is there a pricing plan for softphone calls? i asked Emma, selected Broadband Talk where there is a FAQ about Softphone costs, but the link takes you to a "page not found - 404" page |
| 4 | Christina | I've tried to call the helpdesk in India all day and there is no question at all in my mind that this is the worst service I have ever had from a company. My calls go unanswered and I feel completely ignored. What are they doing?! |

The present invention provides a method by which work can be collected from multiple online resources, for example posts in an online forum, which can then allocated to particular agents. In particular, the work can be allocated to agents on the basis of one of more of the following:
  the content of a post
  the context of a post in a thread
  the interrelationship between different users, for example
    the membership of a social network The present invention uses a new mechanism to gather data on the classification of the posts. Users can be classified according to their tendency to post on particular topics and to use this relationship between the users to derive a meta-tendency. For example, if a user is a member of a group that complains then our system will use that knowledge to bias the classification of posts that the user makes as being complaints. If on the other hand they belong to a group that tends to discuss technical issues then the system will be biased toward the view that a new post from this user will be a technical posting.

As there is a tendency for users to relate their posts to other users' posts within a thread, it is possible to use this to build data structures that express these relationships. A keyword extractor can extract the key words from a post by using statistical analysis over the occurrence of words in the corpus of data and records of previous selections of keywords as significant by users. These keywords can be used to form a fingerprint for each post. This fingerprint is similar to the fingerprints of other posts to the extent of the number of co-occurrences of words in their fingerprints.

TABLE 2

Post Keywords

| Post ID | Author | Post Keyword |
|---|---|---|
| 1 | PaulB | Helpdesk India Unanswered Minutes Technical Resolved Software Update Phone Hub Problems Information |

TABLE 2-continued

Post Keywords

| Post ID | Author | Post Keyword |
|---|---|---|
| 2 | Mike | Update Version Upgrade Software Latest |
| 3 | Zappo | 404 Broadband BT Call Calls Costs Know Need Page Plan Plans Softphone Talk |
| 4 | Christina | Helpdesk, India, Call, Ignore, Unanswered, Question, Service |

The next stage in the process is to determine a number of keyword clusters by a statistical analysis of the keyword occurrences in the corpus. During the operation of the system it may not be necessary to apply meaningful labels to these clusters, but for the purposes of the following example they will be referred to as "Technical" and "Complaint"

A keyword cluster could be created by the following method.
  Assign each keyword to a cluster of one
  Create a matrix of every keyword in the corpus M1
  For each keyword
    Count how many times each keyword in M1 occurs in a
      post with the current keyword Put the keyword K1 with the most co-occurrences in the cluster with this keyword Delete K1 from M1

For example:

The Keywords in the cluster labelled Complaint are: India, Helpdesk, Unanswered, Ignored.

The Keywords in the cluster labelled Technical are: Software, Update, Call, Upgrade, Problem, Phone When applied to the post keywords shown above in Table 2, they can be summarised as set out in FIG. 3 below:

TABLE 3

Post Clustered Keywords

| Post ID | Author | Post Keyword |
|---|---|---|
| 1 | PaulB | {Complaint[India, Helpdesk, Unanswered], Technical[Software, Update, Problem, Phone]} |
| 2 | Mike | {Complaint[ ], Technical[Software, Update, Upgrade]} |
| 3 | Zappo | {Complaint[ ], Technical[Call]} |
| 4 | Christina | {Complaint[India, Helpdesk, Unanswered, Ignored], Technical[Call]} |

It is then possible to assign a post to a topic, for example by determining the ratio of keywords that match a cluster to the total number of keywords in the post and to then select the cluster that has the highest topic assignment measure. Based on the data shown above in FIG. 3, the topic assignment measures for these posts are:

CA(POST 1)={Complaint [0.25], Technical [0.33]}
CA(POST 2)={Complaint [0], Technical [0.6]}
CA(POST 3)={Complaint [0], Technical [0.076]}
CA(POST 4)={Complaint [0.57], Technical [0.14]} and thus the Post Topic Assignments are:

Complaint {4}
Technical {1, 2, 3}

It will be understood that there are a number of alternatives to this method. For example, it would be possible to loosen the criteria used to find and cluster keywords initially and therefore widen the set that could be matched to; normalisation could be introduced for the numbers of keywords in the posts, thresholds could be set for signals. For example, using the last method POST 3 could easily become unclassified and not a member of any cluster. The method of topic post assignment, variations of it and alternative mechanisms that use information from natural language processing techniques are well known in the literature.

The next step in the method according to the present invention is to construct a data store which cross references post classifications with post authorship. For example, the author PeterX has in the past authored a number of posts that were strongly classified as a member of the cluster that was labelled above as Complaint. The author PaulB who wrote POST1 has contributed to a few threads that PeterX have authored and this information is recorded in PaulB's user profile, along with all the other thread memberships that PaulB has created.

This information can be used to infer that PaulB and PeterX are strongly connected as authors. While in the past PaulB has not authored any post that could be classified as a Complaint, he is part of a group of customers that can be labelled as "Complainers"—in the sense that they often create posts that are part of the Complaint cluster. This is referred to as the users "Cluster Affinity". Cluster Affinity is defined as for each user the number of posts that they have contributed to a particular Assignment, divided by the number of posts that they have contributed.

For example;

CAF(PeterX)={Complaint [0.9], Technical [0.1]}
CAF(PaulB)={Complaint [0.7], Technical [0.3]}

As Christina's CAF cannot be determined from her user profile (she may be a new or a sporadic poster), a default value may be assigned to her CAF CAF(Christina)={Complaint [0.5], Technical [0.5]}

The inter-relationship of users is determined by the number of posts that a user has contributed that are then commented on by a further user. If a user1 contributes a post that is commented on by user 2 the relationship between user 1 and user 2 is increased. If user 2 and user 3 have a relationship user 1 might have its relationship with user 3 increased by a smaller amount (which can normalised against all of the users in the system). The cluster relationship value for a user is the normalised sum of the cluster affinity for each user which that user is related to.

Formally:

for all user ui and uj:

UR(ui,uj)=0

For every thread, if ui replies to uj in a thread then UR(ui, uj)++

UR(ui, uk)+=ΔUR (uk, uj) ∀UR(uk, uj) !=0
UR(uj, ul)+=ΔUR (ul, ui) ∀ UR(ul, ui) !=0

Thus, for each Post there is a topic assignment measure that is a matrix of real values {a, b, . . . , n} (where n is the last topic in the corpus), for each user there is a User Affinity Measure that is a matrix of real values {a, b, . . . , n} and for each user there is a User Relatedness Measure that is a 2 dimension matrix of real values (1, 2, . . . , m)×(1, 2, . . . , m) where m is the number of the user.

The final measure of classification that is used is Post Topic Relatedness

Post Topic Relatedness is derived by:

obtaining a post cluster assignment by any method (i.e. See above) CA (c1, c2, . . . , cn);

obtaining the affinity of the user as above CAF(c1, c2, . . . , cn);

obtaining the user relationship value as above UR(ui,uj) where ui & uj are users; and summing these matrixes with weighting co-efficients to give $$PTR = a.CA + b.CAF + c.F(UR)$$

where F(UR) is a function that takes the relationship amongst users and do some analysis to derive some useful conclusion to help calculating the relatedness of the post. For example, if PaulB posts a new thread that have undetermined CA and CAF values (i.e. {0.5, 0.5}), then the value of UR(PaulB, PeterX) could be used to determine that this post could be more likely to be another complaint instead of a technical post. The value of PTR shows how a post is related to one of the topic clusters derived in Cluster Assignment. This enables a topic of a post to be defined using information derived from the post, the post's authorship and the interests of the posts authors social network. Posts can then be forwarded to agents by matching the post topic with the interest or responsibilities of the agent.

It will be understood that the invention may be implemented using software that is run on one or more computers. It will be understood that such software may be deployed via download, for example via the internet, or on some physical media, for example, DVD, CD-ROM, USB memory stick.

What is claimed is:

1. A method of classifying online content, the online content comprising a plurality of data sets, the method comprising the steps of:

a) identifying one or more keywords within each of the data sets;

b) assigning each of the plurality of data sets to one or more categories in accordance with the keywords identified in step a);

c) for each data set author, associating the author with one or more of the categories in accordance with the keywords identified in the data sets created by said author;

d) for each of the data set authors, determining an association between a first said data set author and at least one other data set author based on associating the first data set author with the one or more categories associated with the at least one other data set author; and e) classifying, using a computer processor, each of the plurality of data sets in accordance with outcomes of steps b), c) and d).

2. A method according to claim 1, wherein the classification of each of the plurality of data sets is determined by a weighted combination of the outcomes of steps b), c) and d).

3. A method according to claim 1, wherein the method comprises the further step of:

f) allocating one or more of the data sets to an agent in accordance with the result of step e).

4. A method according to claim 1 wherein keywords for identification are identified from a predetermined set of keywords.

5. A method according to claim 4, wherein in step b) the assigning comprises determining a ratio of keywords that match one of the keyword clusters to the total number of keywords.

6. A method according to claim 5, wherein in step b) a data set is assigned to a category in accordance with the keyword ratio value.

7. A method according to claim 1, wherein the association between the first data set author and the at least one other data set author is determined based on an association between: (i) the one or more categories associated with the first data set author and (ii) the one or more categories associated with the at least one other data set author.

8. A method according to claim 1, wherein the association between the first data set author and the at least one other data set author is determined based on an affinity of the first data set author to provide content related to the one or more categories associated with the at least one other data set author.

9. An apparatus for classifying online content including a plurality of data sets, the apparatus comprising:

a data storage memory;

a central processing unit, operatively coupled to the data storage memory and having at least one computer processor, wherein the central processing unit is configured to:

identify one or more keywords within each of the data sets;

assign each of the plurality of data sets to one or more content categories in accordance with said one or more identified keywords;

for each data set author, associate the data set author with said one or more categories in accordance with the keywords identified in the data sets created by said author;

for each of the data set authors, determine an association between a first said data set author and another data set author based on associating the first data set author with the one or more categories associated with the another data set author; and classify, each of the plurality of data sets in accordance with (i) assignment of each of the plurality of data sets to said one or more categories in accordance with said one or more identified keywords, (ii) association of the author of each of the data sets with said one or more categories, and (iii) the determined association between the first data set author and the another data set author.

10. The apparatus according to claim 9, wherein the classification of each of the plurality of data sets is determined by a weighted combination of (i) said assignment (ii) said association, and (iii) said determined association.

11. The apparatus according to claim 9, wherein the central processing unit is further configured to allocate one or more of the data sets to an agent in accordance with a result of the classification.

12. The apparatus according to claim 9, wherein keywords for identification are identified from a predetermined set of keywords.

13. The apparatus according to claim 12, wherein the central processing unit is further configured to determine a ratio of keywords that match one of the keyword clusters to the total number of keywords.

14. The apparatus according to claim 13, wherein the central processing unit is further configured to assign a data set to a category in accordance with said ratio of keywords.

15. The apparatus according to claim 9, wherein the association between the first data set author and the another data set author is determined based on an association between: (i) the one or more categories associated with the first data set author and (ii) the one or more categories associated with the another data set author.

16. The apparatus according to claim 9, wherein the association between the first data set author and the another data set author is determined based on an affinity of the first data set author to provide content related to the one or more categories associated with the another data set author.

17. A non-transitory computer-readable storage medium storing instructions which upon execution by a computer processing system performs operation comprising:

(a) identifying one or more keywords within each of the data sets;

(b) assigning each of the plurality of data sets to one or more content categories in accordance with the keywords identified in (a);

(c) for each data set author, associating the author with one or more of the categories in accordance with the keywords identified in the data sets created by said author;

(d) for each of the data set authors, determining an association between a first said data set author and another data set author based on associating the first data set author with the one or more categories associated with another data set author; and (e) classifying each of the plurality of data sets based on: said assigning in (b), said associating in (c), and said determining in (d).

18. The non-transitory computer-readable storage medium according to claim 17, wherein the association between the first data set author and the another data set author is determined based on an association between: (i) the one or more categories associated with the first data set author and (ii) the one or more categories associated with the another data set author.

19. The non-transitory computer-readable storage medium according to claim 17, wherein the association between the first data set author and the another data set author is determined based on an affinity of the first data set author to provide content related to the one or more categories associated with the another data set author.

* * * * *